United States Patent
Yamaguchi et al.

(10) Patent No.: US 7,101,165 B2
(45) Date of Patent: Sep. 5, 2006

(54) EXTRUSION MOLDING APPARATUS FOR CERAMIC MOLDED PRODUCT

(75) Inventors: Satoru Yamaguchi, Anjo (JP); Yasunao Miura, Nagoya (JP); Hiromi Katou, Kuwana (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/669,507

(22) Filed: Sep. 25, 2003

(65) Prior Publication Data

US 2004/0062827 A1  Apr. 1, 2004

(30) Foreign Application Priority Data

Oct. 1, 2002  (JP)  ............................. 2002-289130

(51) Int. Cl.
*B28B 17/02* (2006.01)

(52) U.S. Cl. .................. 425/208; 425/209; 425/380; 425/202; 425/376.1; 264/630; 264/632; 366/125; 366/83; 366/79; 366/88; 366/89; 366/90

(58) Field of Classification Search ............... 425/208, 425/198, 202, 209, 380, 376.1; 264/630, 264/632; 366/125, 83, 79, 88–90; B29C 47/10
See application file for complete search history.

(56) References Cited

U.S. PATENT DOCUMENTS

| | | | | |
|---|---|---|---|---|
| 3,941,535 A | * | 3/1976 | Street | 425/208 |
| 4,171,196 A | * | 10/1979 | Maillefer | 425/209 |
| 4,227,870 A | * | 10/1980 | Kim | 425/208 |
| 4,839,120 A | * | 6/1989 | Baba et al. | 264/102 |
| 5,215,764 A | * | 6/1993 | Davis et al. | 425/208 |
| 5,458,834 A | * | 10/1995 | Faber et al. | 264/109 |
| 5,607,636 A | * | 3/1997 | Ito et al. | 264/205 |
| 5,932,159 A | * | 8/1999 | Rauwendaal | 264/211.21 |
| 5,984,516 A | * | 11/1999 | Inoue et al. | 366/85 |
| 5,989,420 A | * | 11/1999 | Sugimoto | 210/222 |
| 6,062,718 A | * | 5/2000 | Fogarty | 366/81 |
| 6,136,246 A | * | 10/2000 | Rauwendaal et al. | 264/211.21 |
| 6,790,025 B1 | * | 9/2004 | Yamaguchi et al. | 425/198 |
| 2002/0014710 A1 | * | 2/2002 | Tsuruta et al. | 264/40.6 |
| 2003/0098530 A1 | * | 5/2003 | Inoguchi | 264/630 |
| 2004/0062828 A1 | | 4/2004 | Yamaguchi et al. | |

FOREIGN PATENT DOCUMENTS

| | | |
|---|---|---|
| CN | 2328499 Y | 7/1999 |
| JP | 2000-238022 | 9/2000 |
| JP | 2002-234012 | 8/2002 |

\* cited by examiner

*Primary Examiner*—Robert Davis
*Assistant Examiner*—G. Nagesh Rao
(74) *Attorney, Agent, or Firm*—Nixon & Vanderhyc PCC

(57) ABSTRACT

An extrusion molding apparatus comprises a shaping die for producing a ceramic molded product, and a screw extruder having built therein an extruding screw (40) for mixing while leading a ceramic material forward. The extruding screw (40) includes a pressing screw portion (410) having a first lead (411) and a dispersing screw portion (420) having a second lead (421) adjacent to a forward end (412) of the pressing screw portion (410). The second lead (421) is formed in such a manner that the rear ends of all the second lead surfaces (426) at the rear end (422) of the dispersing screw portion (420) and the forward end of the first lead surface (416) at the forward end (412) of the pressing screw portion (410) are displaced from each other.

8 Claims, 14 Drawing Sheets

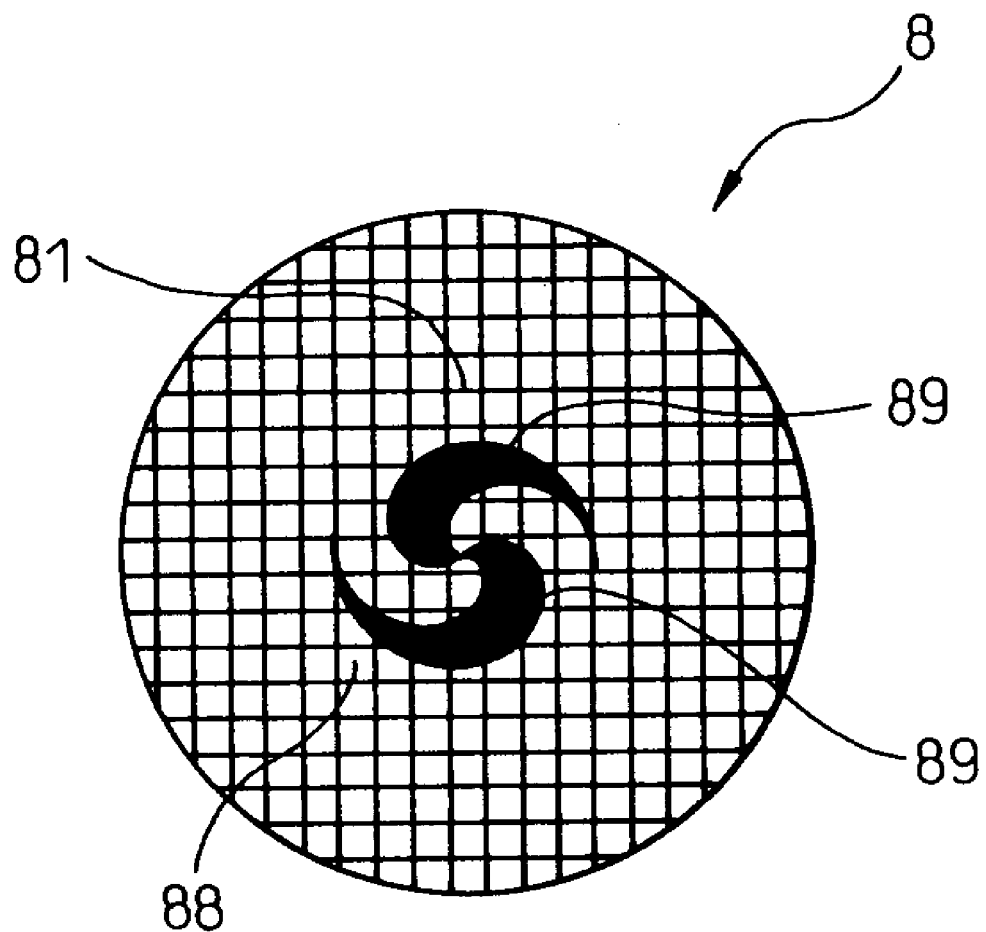

EXTRUSION MOLDING APPARATUS FOR CERAMIC MOLDED PRODUCT

BACKGROUND OF THE INVENTION

1. Field of the Invention

The present invention relates to an extrusion molding apparatus for molding a ceramic molded product such as a honeycombed structure.

2. Description of the Related Art

A ceramic molded product 8 having a honeycombed structure, which is configured so that partitioning walls 81 for partitioning a multiplicity of cells 88 formed through in an axial direction are arranged in the form of a honeycomb as shown in FIG. 16, for example, is used as a catalyst carrier of an exhaust gas purification system of automobiles. This ceramic molded product 8 is generally fabricated by extrusion molding of a mixed ceramic material 80 (FIG. 17).

An extrusion molding apparatus for the ceramic molded product 8, as shown in FIG. 17 as an example, comprises a shaping die 91 for molding a honeycombed structure, and two screw extruders 98 in two stages for mixing and extruding the ceramic material 80 continuously.

The two screw extruders 98 may be replaced with either three or more screw extruders or a single screw extruder with equal effect.

As shown in FIG. 17, the ceramic molded product 8 is molded using an extrusion molding apparatus 9 having the two screw extruders 98 in such a manner that the ceramic material 80, supplied to the upper screw extruder 98 is mixed and advanced by the upper screw extruder 98 and, through a filter 94, is supplied further to the lower screw extruder 98. The lower screw extruder 98 mixes and advances the supplied ceramic material 80, and extrudes it from a shaping die 91 through a filter 93 and a resistance pipe 92. In this way, the honeycombed ceramic molded product 8 is produced.

At least the lower screw extruder 98 has built therein an extruding screw 99 for extruding the ceramic material 80 toward the shaping die 91. This extruding screw 99 is so configured as to mix the ceramic material 80 while at the same time pressing the ceramic material 80 toward the shaping die 91 to thereby extrusion-mold the ceramic material 80 (See Japanese Unexamined Patent Publication No. 2000-238022, for example).

As shown in FIG. 18, however, the ceramic molded product 8 extrusion-molded by the screw extruders 98 develops an uneven portion 89 high in density and low in fluidity of the ceramic material 80 at a position corresponding to the axial center of the extruding screw 99. This uneven portion 89 represents a portion where the ceramic material 80 pressed along the outer surface of the extruding screw 99 and increased in density is concentrated. In the case of a white ceramic material, this uneven portion 89 is visible as a black portion as compared with the surrounding portions.

A conventional extrusion molding apparatus, proposed to eliminate this uneven portion, as shown in FIG. 19, is configured of at least the lower screw extruder 98 having built therein an extruding screw 99 including a pressing screw portion 991 for pressing the ceramic material 80 toward a shaping die 91 and a dispersing screw portion 992 located on the same axis as the pressing screw portion 991 at the forward end thereof. The dispersing screw portion 992, as shown in FIG. 20, for example, can improve the uniformity of the ceramic material 80 by dispersing the uneven portion 89 thereof in a comma pattern or a swirl pattern (See Japanese Unexamined Patent Publication No. 2002-234012, for example).

The conventional extrusion molding apparatus described above, however, has yet to solve the problem described below.

Specifically, the mere dispersion of the ceramic material by the dispersing screw cannot attain a uniform density or a uniform fluidity in some cases. Especially in extrusion molding of a ceramic molded product of a honeycombed structure having thin partitioning walls, this problem often presents itself conspicuously. Specifically, in the case where the density and fluidity of the ceramic material are uneven, different partitioning walls develop different molding rates. The distortion caused by different molding rates is highly liable to deform the ceramic molded product as a whole.

SUMMARY OF THE INVENTION

This invention has been achieved in view of the above-mentioned problems of the prior art, and the object of the invention is to provide an extrusion molding apparatus capable of extrusion molding a highly homogeneous ceramic molded product.

According to a first aspect of the invention, there is provided an extrusion molding apparatus for a ceramic molded product, comprising a shaping die for molding a ceramic molded product and a screw extruder having built therein an extruding screw for mixing a ceramic material while at the same time moving the ceramic material forward, wherein the extruding screw includes a pressing screw portion for pressing the ceramic material toward the shaping die and a dispersing screw portion arranged on the same axis as the pressing screw portion adjacently to the forward end of the pressing screw portion, wherein the pressing screw portion assumes the shape of an axially spiraled ridge and has a first lead of at least one thread having a first lead surface facing forward, wherein the dispersing screw portion assumes the shape of an axially spiraled ridge and has a second lead of at least one thread having a second lead surface facing forward, and wherein a peripheral gap is formed between the rear end of all the second lead surfaces at the rear end of the dispersing screw portion and the forward end of the first lead surface at the forward end of the pressing screw portion.

The most notable feature of the extrusion molding apparatus according to the first aspect of the invention described above is the fact that a peripheral gap is formed between the rear ends of all the second lead surfaces at the rear end of the dispersing screw portion and the forward end of the first lead surface at the forward end of the pressing screw portion. Specifically, the first lead surface of the first lead is discontinued at the forward end of the pressing screw portion and not closely adjacent to the second lead surface.

In the pressing screw portion, the ceramic material is pressed by the first lead surface and led forward along the first lead surface. In the process, an uneven portion high in density and low in fluidity of the ceramic material is liable to develop in the neighborhood of the first lead surface. This uneven portion, if any, moves along the first lead surface and is led into the dispersing screw portion.

In the extrusion molding apparatus described above, a gap is formed between the second lead surface of the dispersing screw portion and the first lead surface of the pressing screw portion.

The uneven portion of the ceramic material that has advanced along the first lead surface is not directly made to advance along the second lead surface of the dispersing screw portion. When led into the dispersing screw portion, the uneven portion is remixed and dispersed by being introduced to the valleys formed between adjacent second leads.

In the first aspect of the invention, therefore, an extrusion molding apparatus is provided in which the ceramic material having become uneven in the pressing screw portion can be made uniform by being remixed in the dispersing screw portion, thereby making it possible to mold, by extrusion, a highly homogeneous ceramic molded product.

According to a second aspect of the invention, there is provided an extrusion molding apparatus for a ceramic molded product, comprising a shaping die for molding a ceramic molded product and a screw extruder having built therein an extruding screw for mixing the ceramic material while at the same time leading the ceramic material forward,
  wherein the extruding screw includes a pressing screw portion for pressing the ceramic material toward the shaping die and a dispersing screw portion arranged on the same axis as the pressing screw portion adjacently to the forward end of the pressing screw portion,
  wherein the pressing screw portion assumes the shape of an axially spiraled ridge and has a first lead of at least one thread having a first lead surface facing forward,
  wherein the dispersing screw portion assumes the shape of an axially spiraled ridge and has a second lead of at least one thread having a second lead surface facing forward, and
  wherein at least a part of the surface of the dispersing screw portion has a differently-shaped portion having a surface shape different to the surrounding portion.

A notable feature of the extrusion molding apparatus according to the second aspect of the invention is the fact that a differently-shaped portion having a surface shape different to the surrounding portion is formed on at least one of the second lead surface, the reverse surface thereof and a surface constituting a valley between adjacent second leads of the dispersing screw portion.

As a result, the ceramic material in the dispersing screw portion develops a turbulent flow due to the differently-shaped portion. This turbulent flow promotes the mixing of the ceramic material and can thus improve the dispersion effect thereof.

The differently-shaped portion described above, therefore, eliminates the uneven portion of the ceramic material by efficient mixing and dispersion.

Also, the differently-shaped portion has the effect of suppressing the creation of a new uneven portion of the dispersing screw portion.

As described above, in the second aspect of the invention, an extrusion molding apparatus is provided in which the uneven portion of the ceramic material can be efficiently dispersed in the dispersing screw portion. At the same time, an uneven portion of the dispersing screw portion is prevented from being created and a highly homogeneous ceramic molded product can be molded by extrusion.

The differently-shaped portion described above may alternatively be arranged in the pressing screw portion. In this case, an uneven portion of the ceramic material can be prevented from developing in the pressing screw portion.

The present invention may be more fully understood from the description of preferred embodiments of the invention, as set forth below, together with the accompanying drawings.

BRIEF DESCRIPTION OF THE DRAWINGS

In the drawings:
FIG. 20 is a front view of a ceramic molded product according to the prior art.

DESCRIPTION OF THE PREFERRED EMBODIMENTS (First Embodiment)

An extrusion molding apparatus for a ceramic molded product according to an embodiment of the invention will be explained with reference to FIGS. 1 to 3.

Figure 1:
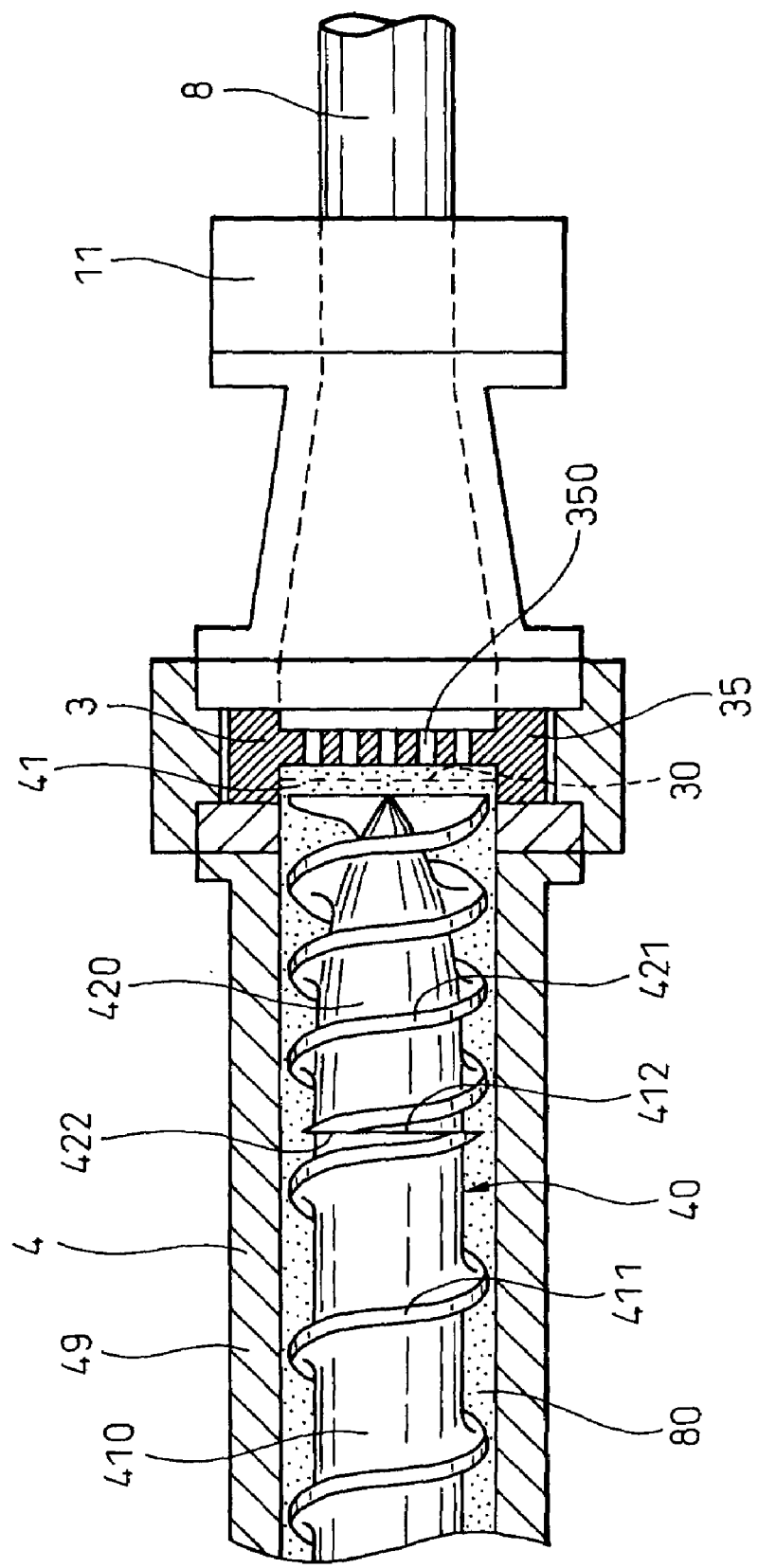
FIG. 1 is a sectional view of an extrusion molding apparatus according to a first embodiment of the invention.

An extrusion molding apparatus 1 according to this embodiment, as shown in FIG. 1, comprises a shaping die for forming a ceramic molded product 8, and a screw extruder 4 having built therein an extruding screw 40 for mixing the ceramic material 80 while at the same time leading it forward.

The extruding screw 40 includes a pressing screw portion 410 for pressing the ceramic material 80 toward the shaping die 11 and a dispersing screw portion 420 arranged on the same axis as the pressing screw portion 410 adjacently to the forward end 412 of the pressing screw portion 410.

Figure 2:
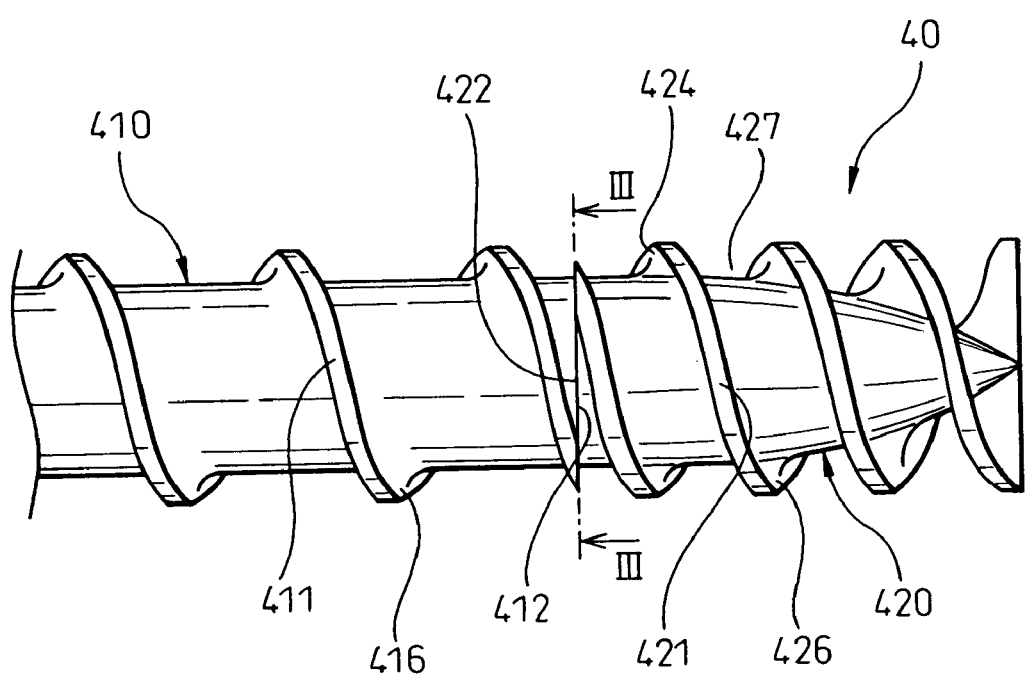
FIG. 2 is a side view of an extruding screw according to the first embodiment of the invention.

The pressing screw portion 410, as shown in FIG. 2, assumes the shape of a ridge spirally formed in an axial direction and includes a first lead 411 having a first lead surface 416 facing forward.

The dispersing screw portion 420 assumes the shape of a ridge extending spirally in an axial direction and includes two threads of a second lead 421 having a second lead surface 426 facing forward.

As shown in FIG. 2, a peripheral gap 44 (FIG. 3) is formed between the rear ends of all the second lead surfaces 426 at the rear end 422 of the dispersing screw portion 420 and the forward end of the first lead surface 416 at the forward end 412 of the pressing screw portion 410.

This configuration will be explained below in detail.

Figure 16:
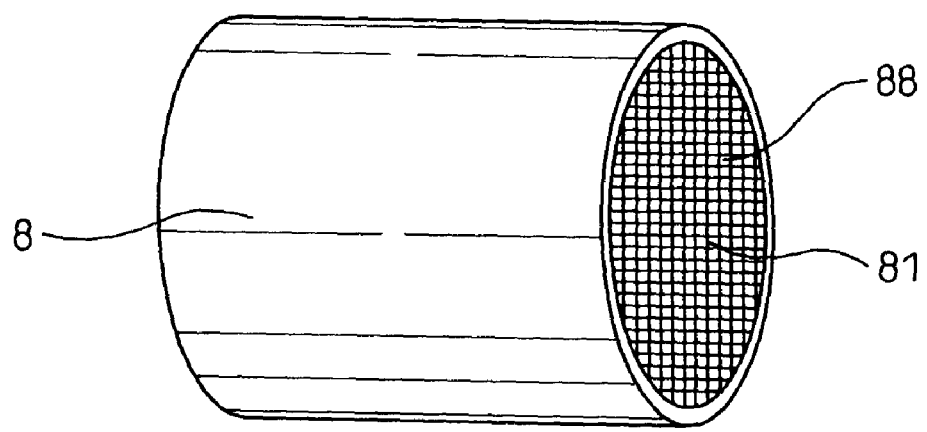
FIG. 16 is a perspective view of a ceramic molded product having a honeycombed structure according to the prior art.

The ceramic molded product 8 to be produced by extrusion molding according to this embodiment constitutes a honeycombed structure used as a catalyst carrier of an exhaust gas purification system of automobiles, as shown in FIG. 16. This honeycombed structure has a multiplicity of cells 88 defined by partitioning walls 81 of ceramic. Especially, the partitioning walls 81 of the ceramic molded product 8 according to this embodiment have a thickness of 75 µm in order to improve the purification performance by suppressing the exhaust gas flow resistance of the honeycombed structure.

The extrusion molding apparatus 1 for the ceramic molded product 8 according to this embodiment, as shown in FIG. 1, comprises a shaping die 11 for shaping the ceramic molded product 8, a screw extruder 4 for supplying the ceramic material 80 to the shaping die 11 and a filter 3 for filtering the ceramic material 80 at an extrusion port 41 of the screw extruder 4.

The filter 3, as shown in FIG. 1, includes a filtering net 30 and a support member 35 for supporting the filtering net 30. The support member 35 is formed with a multiplicity of through-holes 350 for passing the ceramic material 80. The filtering net 30 is formed of a metal net of mesh 200.

The screw extruder 4, as shown in FIG. 1, has built therein an extruding screw 40 in a cylindrical outer wall unit 49. The extruding screw 40 includes a pressing screw portion 410 and a dispersing screw portion 420 arranged adjacently to the forward end 412 of the pressing screw portion 410.

The pressing screw portion 410, as shown in FIG. 2, has a thread of a first lead 411. The pressing screw portion 410 presses the ceramic material 80 by the first lead surface 416 of the first lead 411 and advances the pressed ceramic material 80 toward the shaping die 11.

The dispersing screw portion 420, as shown in FIG. 2, has two threads of a second lead 421. The dispersing screw portion 420 disperses and homogenizes the ceramic material 80 by the second lead 421. A valley 427 is formed between adjacent turns of the second lead 421.

The peripheral positions of the threads of the second lead 421 of the dispersing screw portion 420 are displaced in the direction of rotation in such a manner as to form a gap 44 (FIG. 3) between all the second lead surfaces 426 at the rear end 422 and the first lead surface 416 at the forward end 412.

Figure 3:
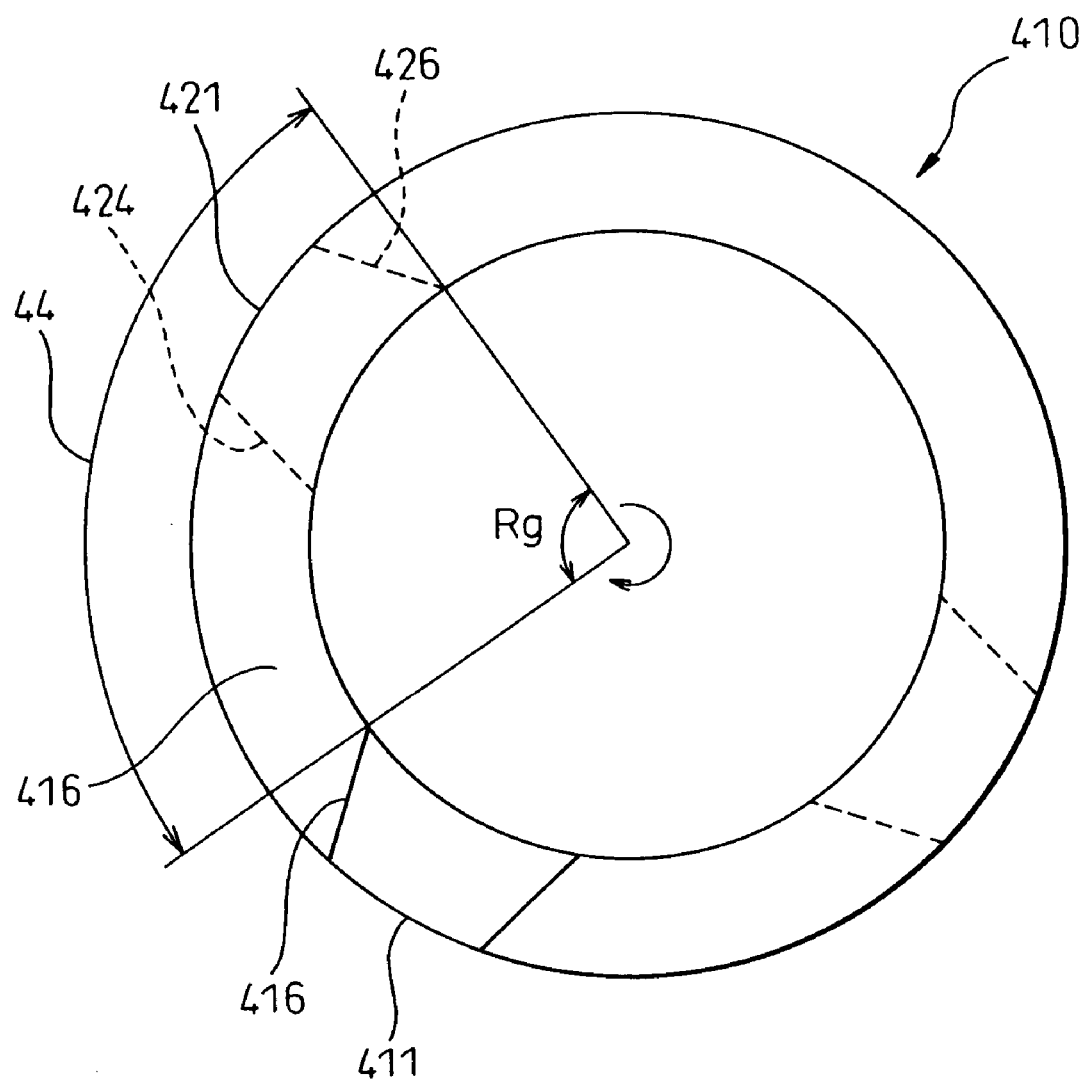
FIG. 3 is a sectional view taken along line III—III in FIG. 2 showing an extruding screw according to the first embodiment.

The displacement angle Rg, as shown in the sectional view of FIG. 3 taken along line III—III in FIG. 2, is 60 degrees with respect to the peripheral position where any of the second lead surfaces 426 of the rear end 422 coincides substantially with the first lead surface 416 of the forward end 412. In FIG. 3, in order to clarify the relative positions of the forward end of the first lead and the rear end of the second lead, the positions of the rear ends of the second lead surfaces 426 are indicated by dotted lines. Also, the displacement angle Rg is indicated with the rotational direction of the dispersing screw portion 420 as a positive direction.

Next, an explanation will be given about a method of extrusion-molding the ceramic molded product 8 by the extrusion molding apparatus 1 having the above-mentioned configuration.

In extrusion-molding the ceramic molded product 8 by this extrusion molding apparatus 1, as shown in FIG. 1, the first step is to charge the ceramic material 80 into the screw extruder 4 from the upstream side of the screw extruder 4. This ceramic material 80 is pressed by the first lead surface 416 of the first lead 411 of the pressing screw portion 410 and advanced toward the dispersing screw portion 420.

In the process, the ceramic material 80 located on and in the neighborhood of the first lead surface 416 making up the forward surface of the first lead 411 in the direction of extrusion is pressed to a high density. The ceramic material 80 thus increased in density, as compared with the low-density portion thereof, is reduced in fluidity. This uneven portion composed of the ceramic material high in density and low in fluidity advances as it is along the first lead surface 416 of the first lead 411 and is introduced into the dispersing screw portion 420.

As described above, the gap 44 is formed in peripheral direction, as shown in FIG. 3, between the first lead surface 416 at the forward end 412 of the pressing screw portion 410 and the second lead surfaces 426 at the rear end 422 of the dispersing screw unit 420. The uneven portion that has advanced along the first lead surface 416 of the first lead 411, therefore, is not directly led along the second lead surfaces 426 of the dispersing screw portion 420. Instead, the uneven portion is introduced into the valley 427 of the dispersing screw portion 420 and, after being remixed, is dispersed into a uniform state.

As shown in FIG. 1, the ceramic material 80 that has been remixed into a uniform state by the dispersing screw portion 420 is charged into the filter 3 to remove foreign matter and the like, and then charged into the shaping die 11. Using this shaping die 11, a ceramic molded product 8 having a honeycomb structure is molded by extrusion.

As described above, the ceramic molded product 8 molded by extrusion according to this embodiment is a honeycombed structure having so high a quality that the molding rate difference is small between the partitioning walls 81, and the walls are rarely deformed after molding.

As described above, with the extrusion molding apparatus 1 according to this embodiment, the uneven portion of the ceramic material 80 generated by the pressing screw portion 410 is mixed and dispersed again into a uniform state by the dispersing screw portion 420.

Especially, with the extrusion molding apparatus 1 according to this embodiment, the uneven portion generated along the first lead surface 416 of the first lead 411 is not directly advanced along the second lead surfaces 416 of the second leads 421. Specifically, the uneven portion of the ceramic material 80 is charged into the valley 427 and mixed as it is introduced into the dispersing screw portion 420.

Figure 19:
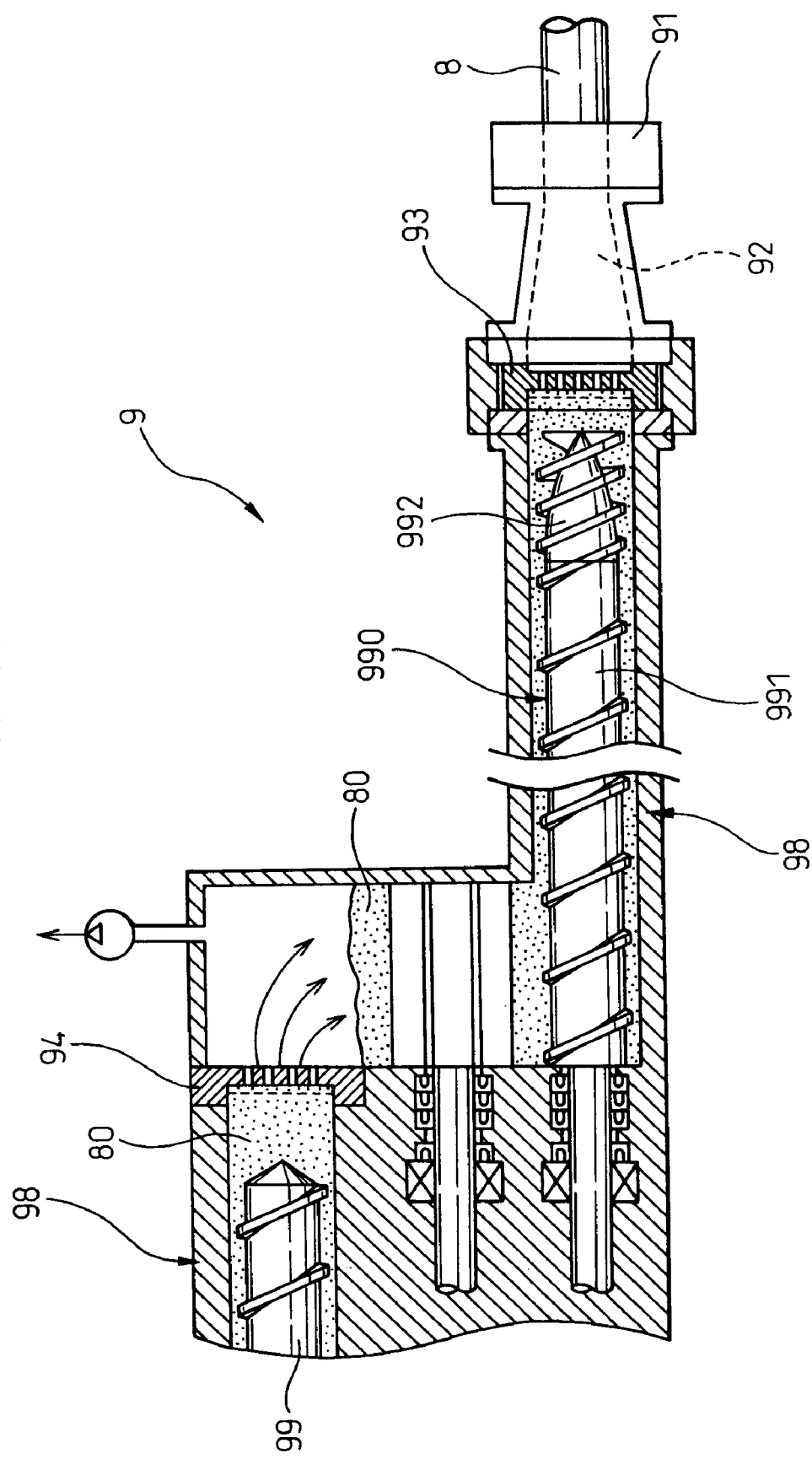
FIG. 19 is a sectional view of an extrusion molding apparatus according to the prior art.

As a result, the extrusion molding apparatus 1 according to this embodiment can exhibit a high dispersion effect as compared with the extrusion molding apparatus 90 (FIG. 19) having the conventional dispersing screw 992.

In this way, with the extrusion molding apparatus 1 according to this invention, a highly homogeneous ceramic material 18 can be molded by extrusion. The ceramic molded product 18 thus extrusion-molded has a superior quality with a high homogeneity. The partitioning walls 81 arranged in honeycomb form, even if as thin as 75 μm, are rarely deformed by strain or the like.

Figure 5:
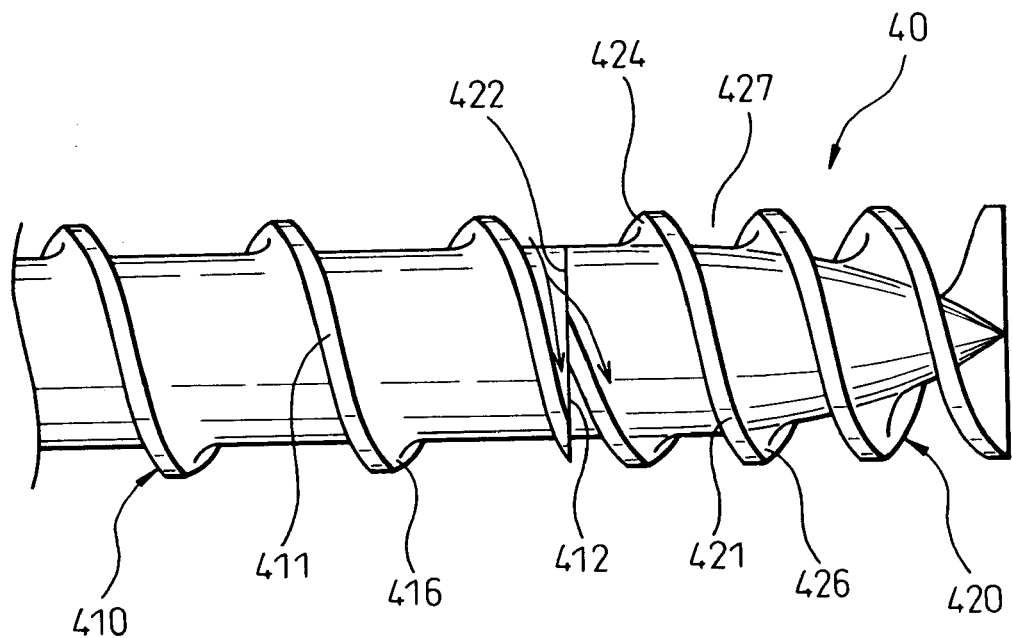
FIG. 5 is a side view of another extruding screw according to the first embodiment of the invention.

As shown in FIG. 5, the displacement angle Rg (FIG. 3) of the second leads 421 along the peripheral direction may be set to 30 degrees to reduce the size of the gap 44 (FIG. 3). In this case, the uneven portion of the ceramic material 80 generated along the first lead surface 416 of the first lead 411 is separated by the second leads 421 at the rear end 422 of the dispersing screw portion 420 into the flow along the second lead surfaces 426 and the flow along the reverse surfaces 424 thereof.

Figure 4:
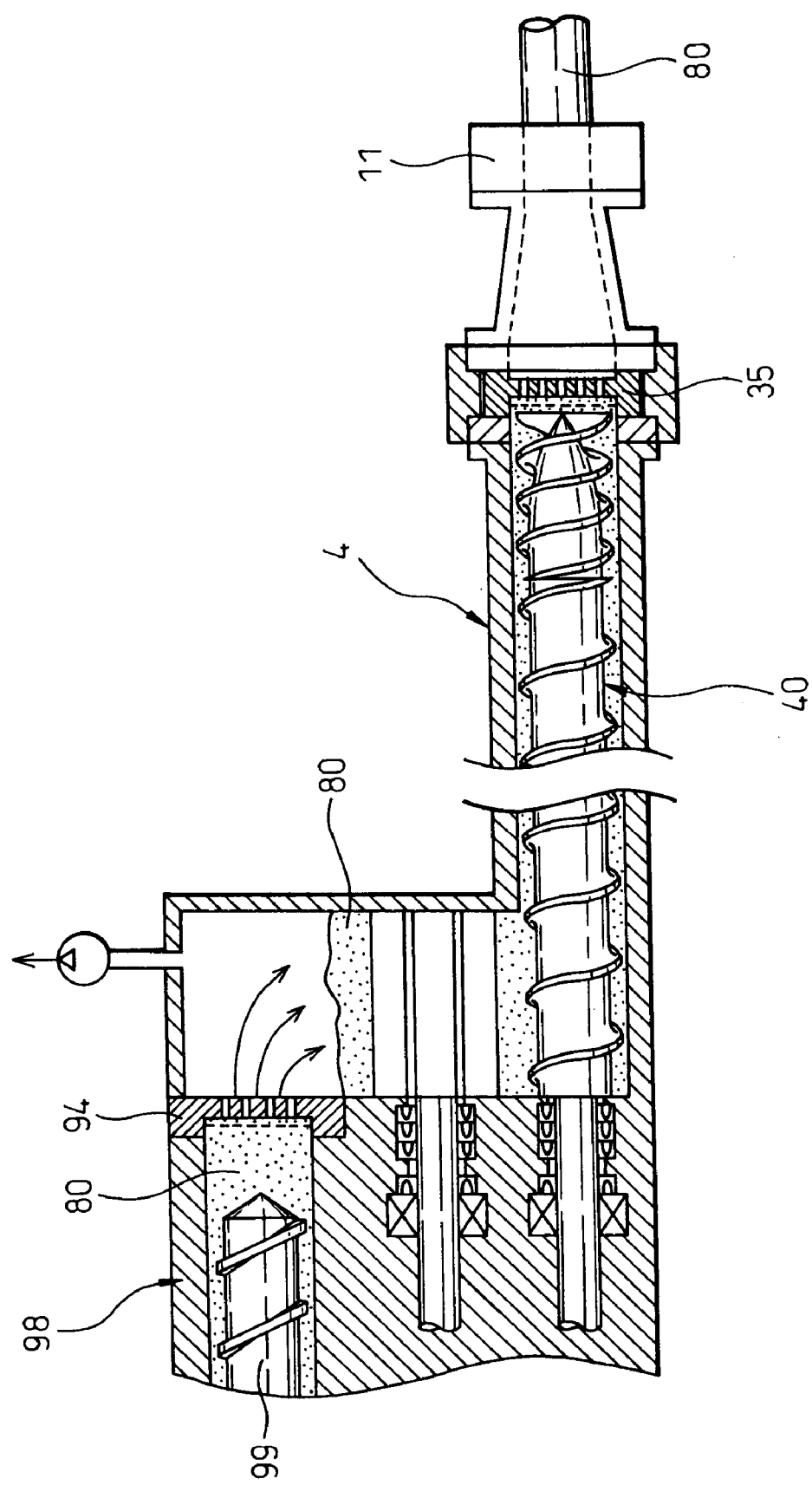
FIG. 4 is a sectional view of another extrusion molding apparatus according to the first embodiment of the invention.
Figure 17:
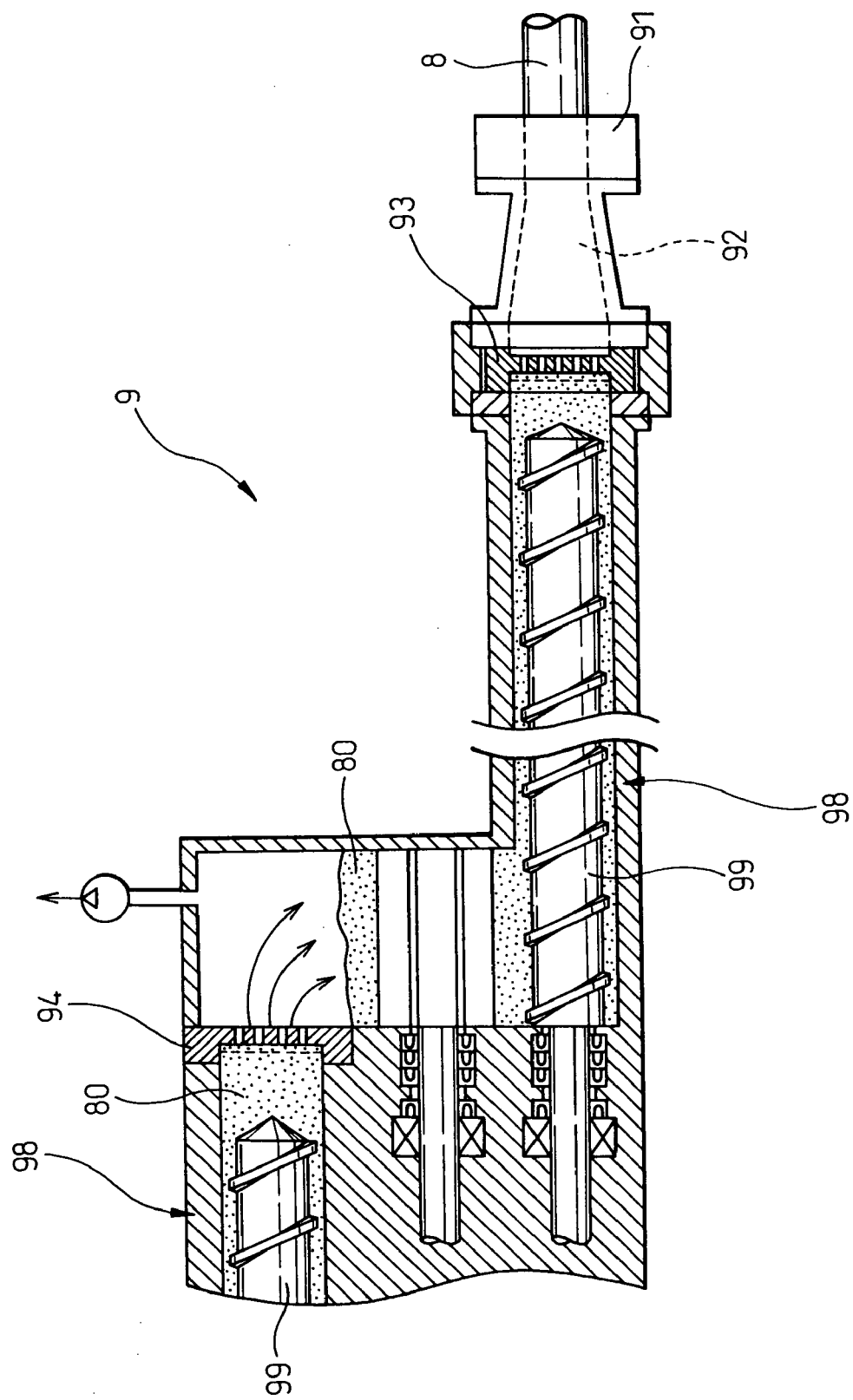
FIG. 17 is a sectional view of an extrusion molding apparatus according to the prior art.
Figure 18:
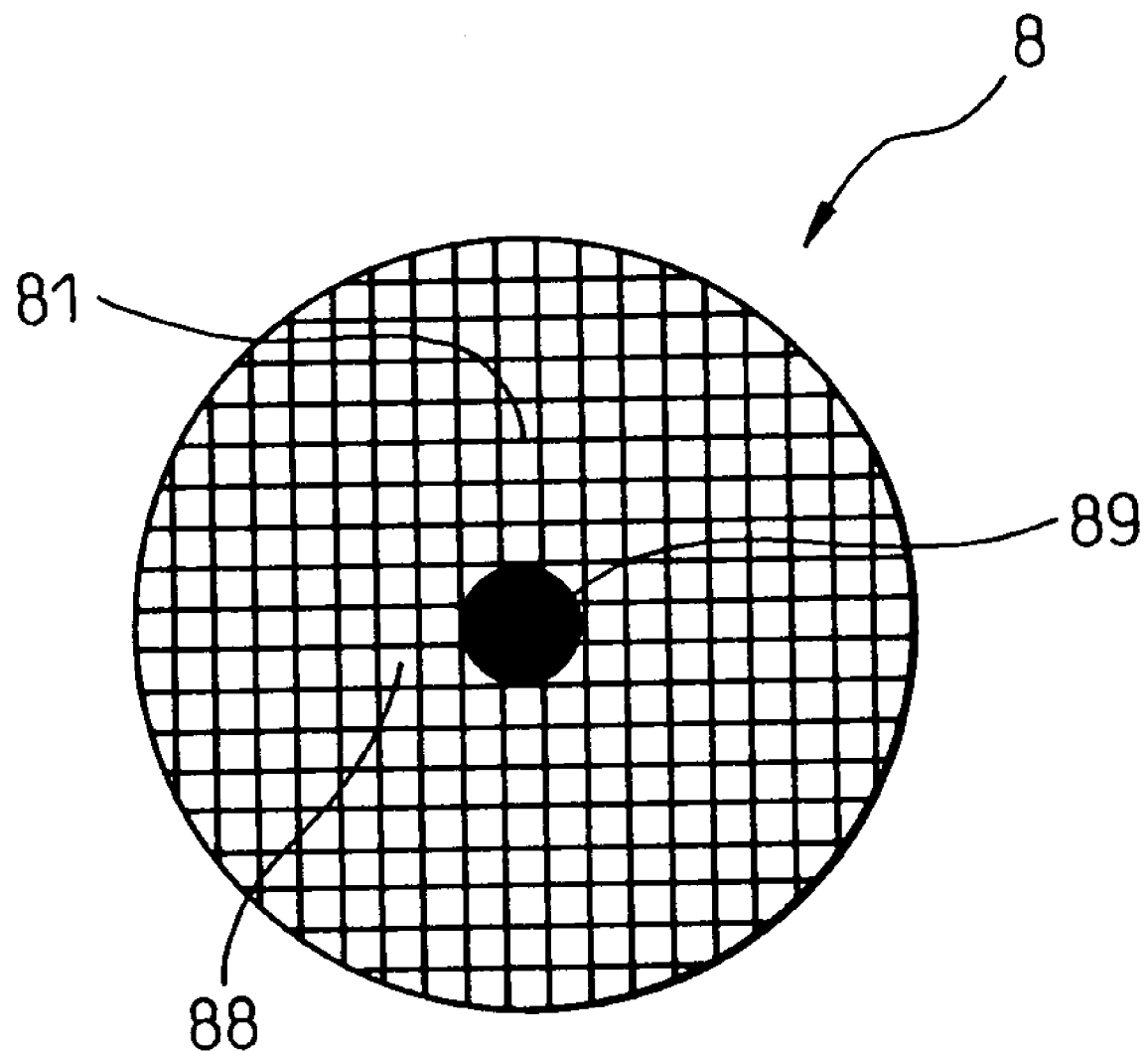
FIG. 18 is a front view of a ceramic molded product according to the prior art.

The extrusion molding apparatus 1 according to this embodiment may further comprise a screw extruder 98 (FIG. 17) above the screw extruder 4 described above to make a double-stage configuration, as shown in FIG. 4.

In this case, a more homogeneous ceramic molded product 8 can be produced by extrusion molding by supplying a more homogeneous ceramic material 80 to the lower screw extruder 4. This ceramic molded product 8 has a superior quality substantially free of distortion.

(Second Embodiment)

According to this embodiment, differently-shaped portions having a surface shape different to the surrounding portion are added to the surface of the dispersing screw portion of the extrusion molding apparatus according to the first embodiment.

Figure 6:
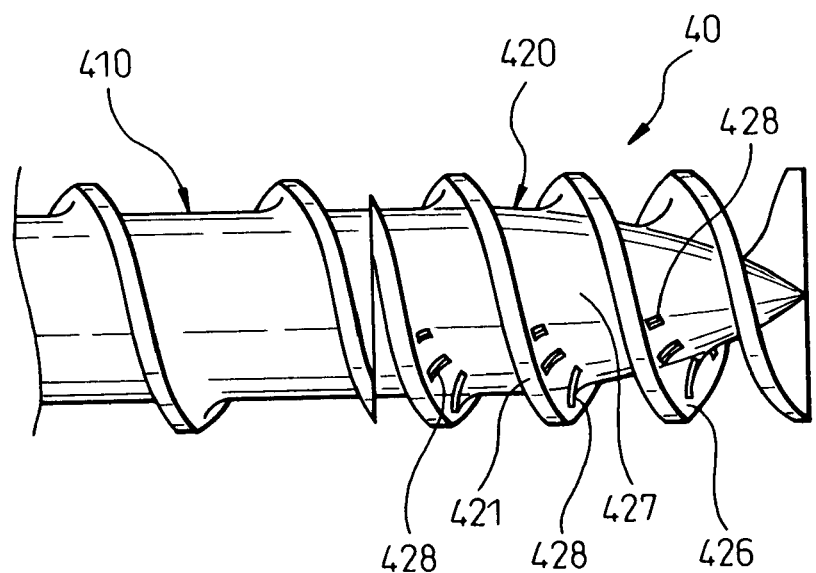
FIG. 6 is a side view of an extruding screw according to a second embodiment of the invention.
Figure 7:
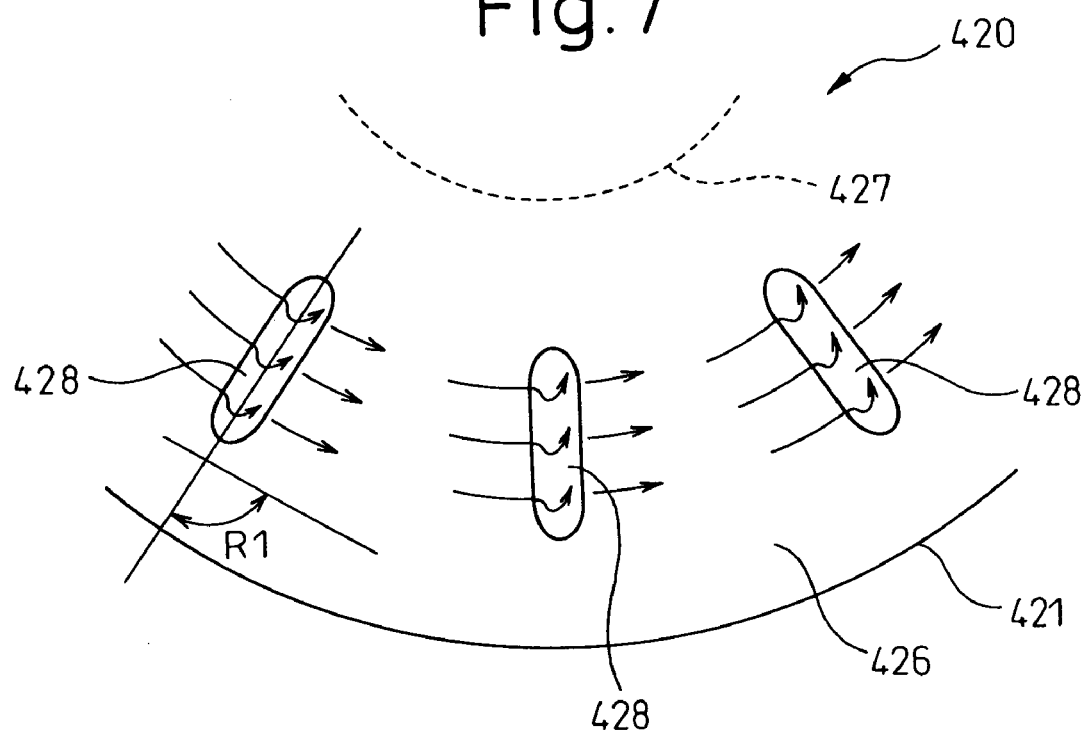
FIG. 7 is a front view of depressions according to the second embodiment.

In a dispersing screw portion 420 according to this embodiment, as shown in FIG. 6, a differently-shaped portion is arranged on the second lead surfaces 426 of the second leads 421. The differently-shaped portions according to this embodiment, as shown in FIG. 6, are a plurality of depressions 428 having a substantially semicircular cross section formed inward. The depressions 428, as shown in FIG. 7, assume the shape of grooves longer in the direction substantially perpendicular to the spiraling direction of the second lead 421 of the dispersing screw portion 420, i.e. the direction of the flow of the ceramic material 80.

Figure 8:
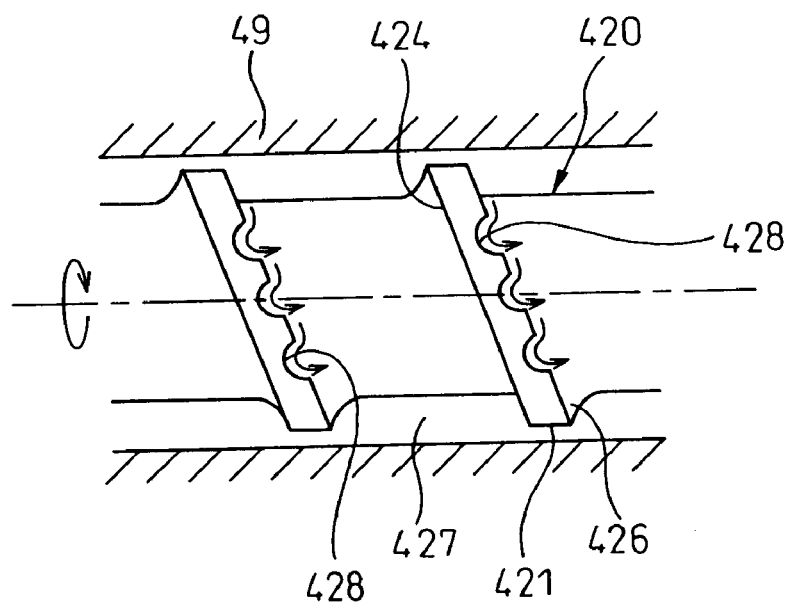
FIG. 8 is a sectional view of depressions according to the second embodiment.

The depressions 428 generate a turbulent flow in the ceramic material 80 flowing in the dispersing screw portion 420, as shown in FIG. 8, and thus promote the mixing of the ceramic material 80. Specifically, the depressions 428 can exhibit the effect of making uniform, by dispersing, the uneven portion of the ceramic material 80 generated in the pressing screw portion 410.

Also, the depressions 428 formed on the second lead surfaces 426 of each second lead 421 in the forward direction of extrusion can suppress the generation of the uneven portion in the dispersing screw portion 420.

As described above, the extrusion molding apparatus according to this embodiment has a still higher effect of homogenizing the ceramic material 80 in the dispersing screw portion 420. As a result, the ceramic molded product 8 extrusion-molded by this extrusion molding apparatus has a still higher quality of homogeneity and is less liable to be deformed.

The other configuration and operational effects are similar to those of the first embodiment.

According to this embodiment, the grooved depressions 428 are formed to extend in the direction substantially perpendicular to the flow of the ceramic material 80 in the dispersing screw portion 420. As an alternative, the depressions 428 are also effectively formed at an angle to the direction of flow of the ceramic material 80.

Figure 9:
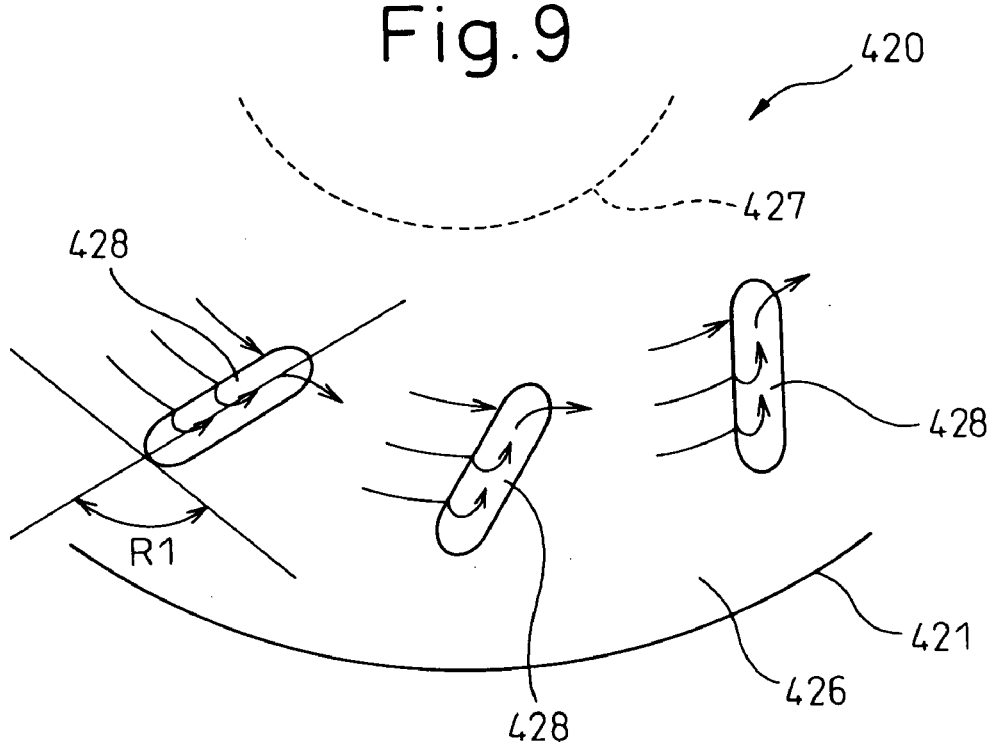
FIG. 9 is a front view of other depressions according to the second embodiment.
Figure 10:
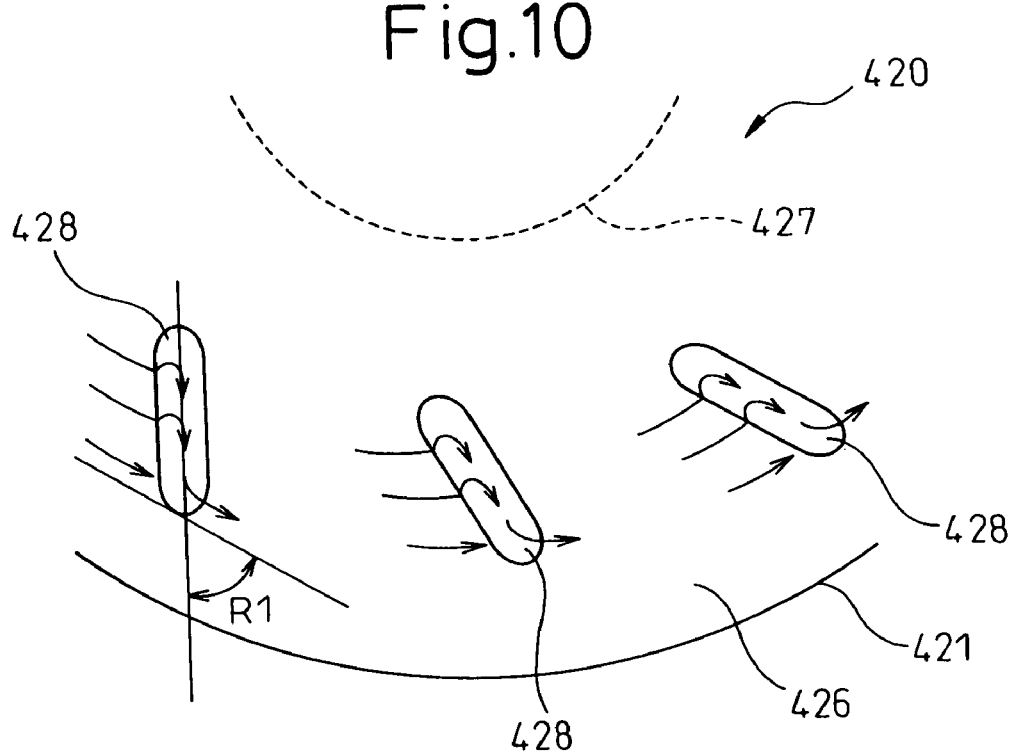
FIG. 10 is a front view of still other depressions according to the second embodiment.

In the case where the angle R1 formed between the longitudinal direction of the depression 428 and the direction of flow of the ceramic material 80 is increased beyond 90 degrees, as shown in FIG. 9, the ceramic material 80 located on the outer peripheral side is positively introduced to the inner peripheral side and thus the mixing of the ceramic material 80 can be promoted. Also, in the case where the angle R1 between the longitudinal direction of the depression 428 and the direction of flow of the ceramic material 80 is decreased below 90 degrees, as shown in FIG. 10, the ceramic material 80 located on the inner peripheral side is introduced positively to the outer peripheral side and therefore the mixing of the ceramic material 80 is promoted.

Also, depressions 428 extending from the second lead surface 426 to the surface of the valley 427 can be formed. Further, depressions 428 can be formed on the reverse side 424 of each second lead surface 426.

Furthermore, the shape of the cross section of each depression 428 can be substantially rectangular instead of substantially semicircular as in this embodiment.

Figure 11:
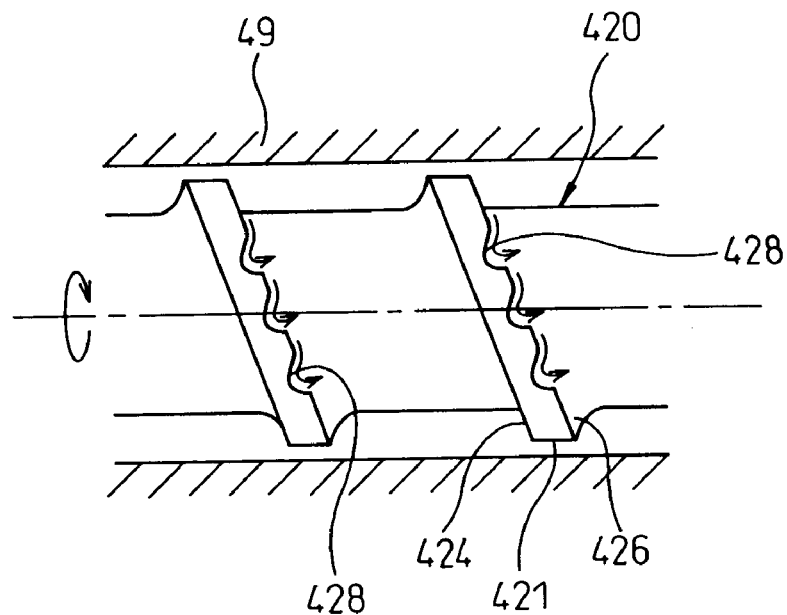
FIG. 11 is a sectional view of yet other depressions according to the second embodiment.

As shown in FIG. 11, the cross section of the depressions 428 is also effectively shaped in such a manner that the radius of curvature of the arc of the cross section on the inflow side of the ceramic material 80 is increased, while the radius of curvature of the sectional arc on the outflow side of the ceramic material 80 is decreased. In such a case, the flow of the ceramic material 80 in the depressions 428 is smooth and the stagnation of the flow in the depressions 428 can be suppressed while at the same time maintaining the high effect of dispersing the ceramic material 80.

Figure 12:
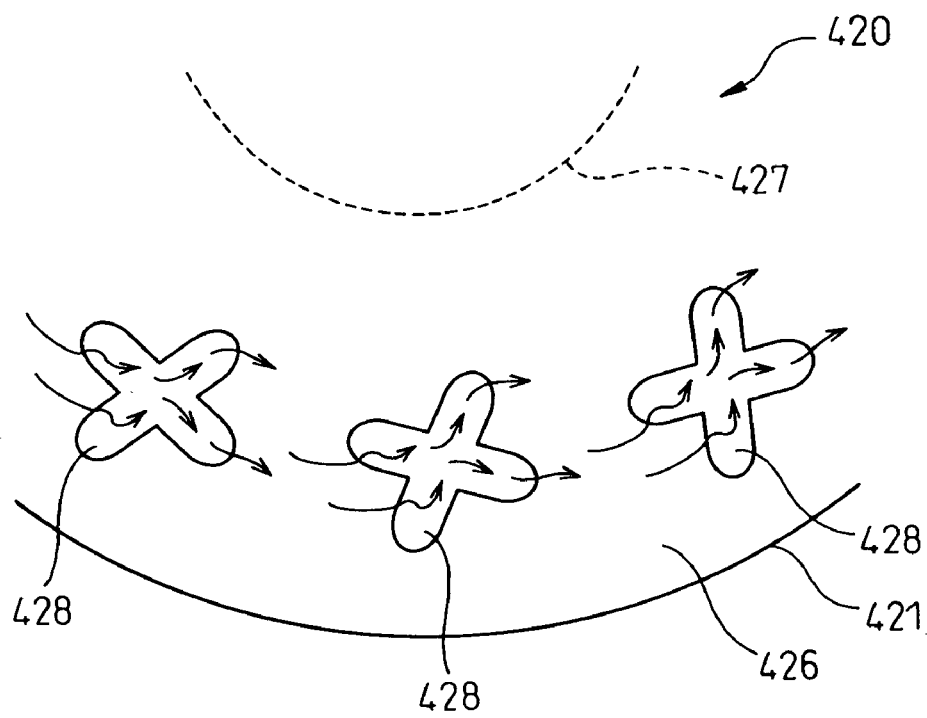
FIG. 12 is a front view of further depressions according to the second embodiment.

Further, as shown in FIG. 12, it is also effective to arrange depressions 428, each in the form of two grooved depressions superposed one on the other. In this case, the ceramic material 80 on the inner peripheral side can be led to the outer peripheral side, and vice versa. In this way, the ceramic material 80 on both inner and outer peripheral sides can be mixed with each other for a further improved dispersion effect.

In place of the depressions 428, protrusions (not shown) may be formed. In forming protrusions, the same variations of the shape of the cross section, the superposition of the protrusions, etc. are conceivable as in the case of the depressions 428.

Furthermore, according to this embodiment, the differently-shaped portions are arranged only in the dispersing screw portion 420. Nevertheless, the differently-shaped portions can, alternatively, be arranged in the pressing screw portion 410. In this case, the uneven portion of the ceramic material can be prevented from developing in the pressing screw portion 410.

(Third Embodiment)

This embodiment represents a case in which a through-hole is added to the second lead as a differently-shaped portion in the dispersing screw portion of the extrusion molding apparatus according to the first embodiment.

Figure 13:
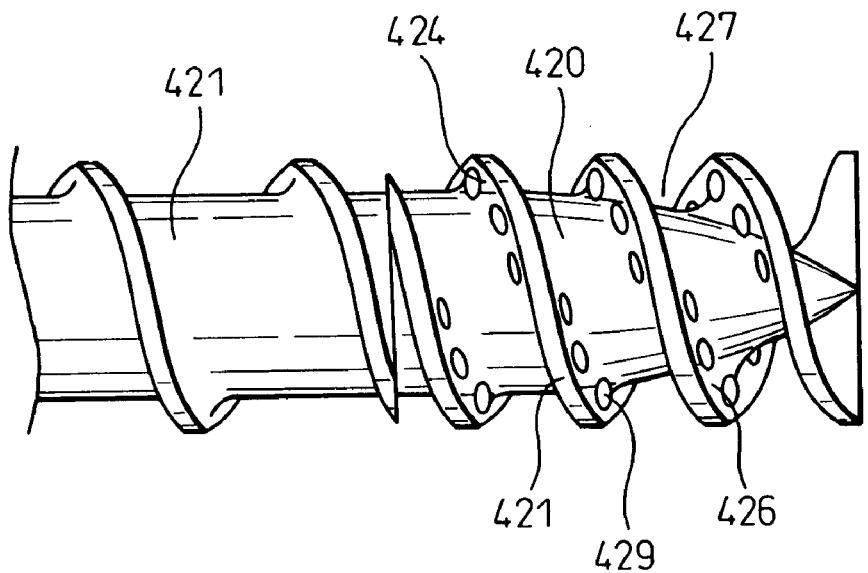
FIG. 13 is a side view of an extruding screw according to a third embodiment of the invention.

In the dispersing screw portion 420 according to this embodiment, the second leads 421 are provided with through-holes 429 passing through the second leads 421 while at the same time opening to the second lead surfaces 426 and the reverse sides 424 of the surfaces 426, as shown in FIG. 13.

This through-holes 429 are arranged in such a manner that the angle R2 formed between the direction in which the through-holes are formed and the direction in which the second leads 421 are spiraled is substantially at right angles to each other. In other words, the through-holes 429 are arranged in the direction substantially at right angles to the flow of the ceramic material 80 in the dispersing screw portion 420.

Figure 14:
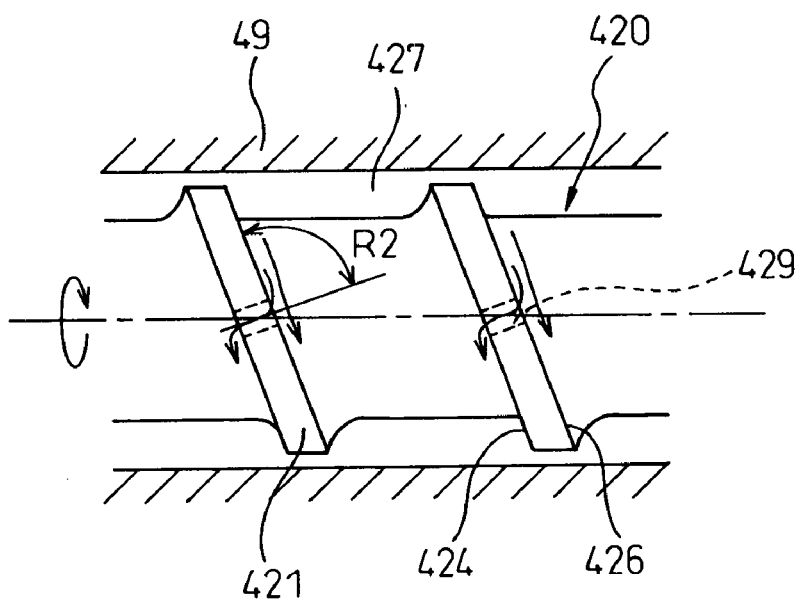
FIG. 14 is an enlarged side view of a dispersing screw portion according to the third embodiment.

The through-holes 429, as shown in FIG. 14, permit the ceramic material 80 on the second lead surface 426 side of the dispersing screw portion 420 to mix with the ceramic material 80 on the reverse side 424 thereof.

The second lead surfaces 426 of the second leads 421 are so configured as to advance the ceramic material 80 forward, and the density of the ceramic material 80 is high on, and in the neighborhood of, the second lead surfaces 426. On the reverse sides 424 of the second lead surfaces 426, on the other hand, the density of the ceramic material 80 is relatively low.

Thus, the through-holes 429 can promote the positive mixing between the high-density ceramic material 80 and the low-density ceramic material 80, thereby making it possible to efficiently disperse and homogenize the ceramic material 80.

As described above, with the dispersing screw portion 420 according to this embodiment, the high-density ceramic material 80, on and in the neighborhood of, the second lead surfaces 426 and the low-density portion on, and in the neighborhood of, the reverse sides 424 can be positively mixed with each other. Therefore, the ceramic material 80 can be dispersed more efficiently.

In the extrusion molding apparatus according to this embodiment, therefore, a homogeneous ceramic material 80 can be molded by extrusion and a ceramic molded product 8 having a superior quality free of distortion can be produced by extrusion molding.

The other aspects of the configuration and the operational effects are similar to those of the first embodiment.

Figure 15:
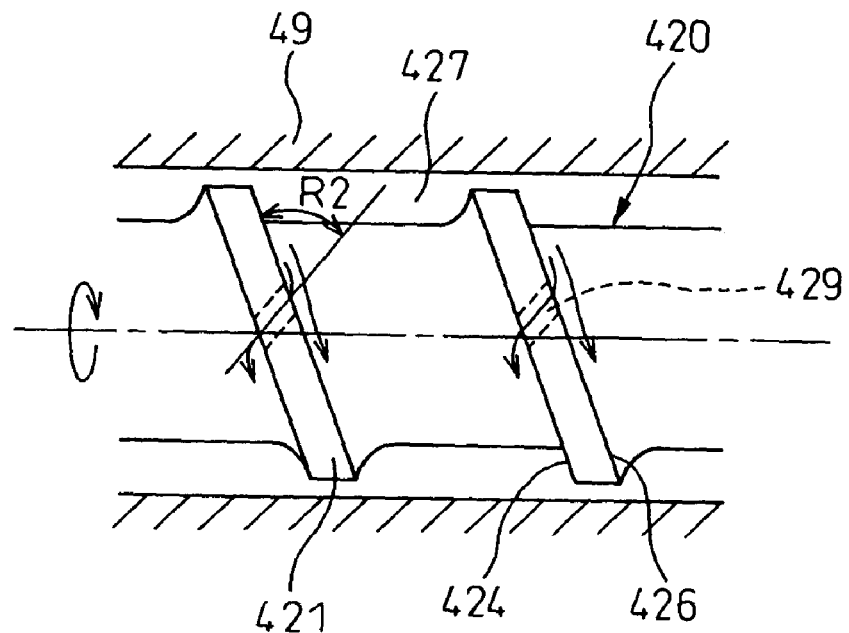
FIG. 15 is an enlarged side view of another dispersing screw portion according to the third embodiment.

The through-holes 429 according to this embodiment are formed substantially at right angles to the second lead surface 426 of the second lead 421, as shown in FIG. 14. As shown in FIG. 15, on the other hand, the angle R2 formed between the second lead surface 426 and the direction in which the through-holes 429 are formed may be set to a steep angle. In this case, the dispersion effect can be improved by increasing the amount of the ceramic material 80 introduced into the through-holes 429.

In the case where the angle R2 is set to an obtuse angle, on the other hand, the dispersion effect can be produced while at the same time maintaining the power of the dispersing screw portion 420 to propel the ceramic material 80.

The other aspects of the configuration and the operational effects of this embodiment are similar to those of the first embodiment.

According to this invention, the dispersing screw portion includes a thread of the second lead. The second lead is preferably displaced by 10 to 350 degrees in the peripheral direction of rotation of the extruding screw with reference to the position where the second lead surface at the rear end portion coincides with any one of the first lead surfaces at the forward end of the first lead.

In this case, the second lead surface at the rear end of the one thread of the second lead and the first lead surface at the forward end of the first lead can be positively displaced. By displacing the second lead surface and the first lead surface in this way, the operational effects of the invention described above can be exhibited more properly.

The second lead of a single thread described above is formed in such a manner as to coincide with the original position when displaced by 360 degrees. For this purpose, the angular range described above is set to a proper value between not smaller than 0 degree and smaller than 360 degrees. As a result, this angular range plus an integer multiple of 360 degrees is equivalent to the particular angular range.

In the case where the angle by which the second lead is displaced is not smaller than 0 degree but smaller than 10 degrees or larger than 350 degrees but smaller than 360 degrees, the gap between the first lead surface of the first lead and the second lead surface of the second lead is insufficient, and the ceramic material probably fails to exhibit a sufficient dispersion effect.

More preferably, the second lead is displaced by 30 to 90 degrees or 270 to 330 degrees in the peripheral direction of rotation of the extruding screw. In such a case, the ceramic material is sufficiently mixed and the homogeneity thereof can be further improved.

The dispersing screw portion has two threads of the second leads. The second leads are preferably arranged displaced by 10 to 17 degrees in the peripheral direction of rotation of the extruding screw with reference to the position where any one of the second lead surfaces at the rear end coincides with any one of the first lead surfaces at the forward end of the first lead.

In this case, the second lead surface at the rear end of the second lead having two threads and the first lead surface at the forward end of the first lead can be positively displaced. By displacing the second lead surface and the first lead surface in this way, the operational effects of the invention can be exhibited more properly.

The two threads of the second leads are formed at an interval of 180 degrees from each other. The above-mentioned angular range, therefore, represents a desirable one between not smaller than 0 degree and smaller than 180 degrees. Therefore, the aforementioned angular range plus an integer multiple of 180 degrees is equivalent to the particular angular range.

In the case where the angle by which the second lead is displaced is not smaller than 0 degree but smaller than 10 degrees, or larger than 170 degrees but smaller than 180 degrees, the gap between the first lead surface of the first lead and the second lead surface of the second lead is insufficient, and the dispersion effect for the ceramic material may not be fully exhibited.

More preferably, the second lead is displaced by 30 to 70 degrees or 110 to 150 degrees in the peripheral direction of rotation of the extruding screw. In this case, the ceramic material is sufficiently mixed for a still higher homogeneity.

The dispersing screw portion described above has three threads of the second leads. The second leads are preferably located displaced by 10 to 110 degrees in the peripheral direction of rotation of the extruding screw with reference to the position where any one of the second lead surfaces at the rear end and any one of the first lead surfaces at the forward end of the first lead coincide with each other.

In this case, the second lead surface at the rear end of the first lead and the first lead surface at the forward end of the first lead can be positively displaced. By displacing the second lead surface and the first lead surface in this way, the operational effects of the invention can be exhibited more properly.

The three threads of the second lead are formed at intervals of 120 degrees from each other. A preferable angular range, therefore, is between not smaller than 0 degree and smaller than 120 degrees. This angular range plus an integer multiple of 120 degrees and, therefore, is equivalent to the particular angular range.

In the case where the angle by which the second lead is displaced is not smaller than 0 degree but smaller than 10 degrees, or larger than 110 degrees but smaller than 120 degrees, then, the gap between the first lead surface of the first lead and the second lead surface of the second lead is insufficient, and a sufficient dispersion, of the ceramic material, may not be obtained.

More preferably, the second lead is displaced by 30 to 40 degrees or 80 to 90 degrees in the peripheral direction of rotation of the extruding screw. In this case, the ceramic material is sufficiently mixed for a further improved homogeneity.

According to this invention, the differently-shaped portion is preferably a protrusion higher than the surrounding area or a depression deeper than the surrounding area.

In this case, the flow of the ceramic material in the dispersing screw portion can be efficiently disturbed. The resulting turbulent flow of the ceramic material promotes the mixing of the ceramic material and can disperse the uneven portion thereof.

In view of the fact that protrusions or depressions are formed on the second lead surface, the reverse side thereof or the surface of each valley between adjacent ones of the second leads, the uneven portion of the ceramic material is prevented from being formed in the dispersing screw portion.

The protrusions or the depressions may have various shapes of the cross section, including a rectangle, a semicircle and a combination of an arc and a straight line. In the case of a rectangle, the flow of the ceramic material is disturbed very effectively and therefore the ceramic material can be efficiently dispersed. In the case where the cross section is semicircular, the stagnation of the ceramic material around each protrusion or in each depression can be suppressed. In the case where the shape of the cross section is a combination of an arc and a straight line, on the other hand, the ceramic material may be prevented from stagnating while at the same time it mixes efficiently.

The differently-shaped portion is preferably formed at least on the second lead surface.

In this case, the ceramic material is mixed on or in the neighborhood of the second lead surface having a large friction with the ceramic material and therefore can be efficiently dispersed.

Also, a new uneven portion is prevented from being generated along the second lead surface.

Further, the differently-shaped portion preferably is a through-hole which opens to the second lead surface of the second lead on the one hand and to the reverse side of the second lead through the second lead on the other.

In this case, the flow of the ceramic material along the second lead surface can be separated into the flow directly advancing along the second lead surface and the flow moving to the reverse side via the through holes. In this way, the ceramic material on the second lead surface and the ceramic material on the reverse side of the second lead, which otherwise might never be mixed with each other, can be positively mixed with each other.

The ceramic material on the second lead surface is high in both pressure and density, while the ceramic material on the reverse side thereof is low in both pressure and density. Mixing these two types of ceramic materials with each other, therefore, effectively contributes to the uniformity of the ceramic material as a whole.

Thus, the through-holes can still more efficiently disperse the uneven portion of the ceramic material in the pressing screw portion.

Also, the through holes of the dispersing screw portion can substantially prevent a new uneven portion from being generated along the second lead.

According to this invention, the shaping die described above is for producing a ceramic molded product having a honeycombed structure in which the partitioning walls making up a multiplicity of cells formed in an axial direction are arranged in the form of honeycomb. The thickness of the partitioning walls of the ceramic molded product is preferably not larger than 100 µm.

In the case where the thickness of the partitioning walls of the ceramic molded product is not more than 100 µm, the ceramic molded product is liable to be deformed by the distortion caused by the unevenness of the ceramic material making up the ceramic molded product, and therefore the operational effects of the invention are especially conspicuous.

Also, the shaping die described above is intended to produce a sheet-like ceramic molded product, and the thickness of the ceramic molded product is preferably not more than 100 µm.

In the case where the thickness of the ceramic molded product is not more than 100 µm, the ceramic molded product is liable to be deformed by the distortion caused by the unevenness of the ceramic material making up the ceramic molded product, and therefore the operational effects of the invention are especially conspicuous.

While the invention has been described by reference to specific embodiments chosen for purposes of illustration, it should be apparent that numerous modifications could be made thereto by those skilled in the art without departing from the basic concept and scope of the invention.

What is claimed is:

1. An extrusion molding apparatus for a ceramic molded product, comprising a shaping die for producing a ceramic molded product and a screw extruder having built therein an extruding screw for mixing and leading a ceramic material forward, wherein said extruding screw includes a pressing screw portion for pressing said ceramic material toward said shaping die and a dispersing screw portion arranged on the same axis as said pressing screw portion adjacently to the forward end of said pressing screw portion, wherein said pressing screw portion assumes the shape of a ridge spirally formed in an axial direction and includes at least one thread of a first lead having a first lead surface facing forward, wherein said dispersing screw portion assumes the shape of a ridge spirally formed in an axial direction and includes at least one thread of a second lead having a second lead surface facing forward, wherein a gap is formed in a peripheral direction between the rear ends of all of said second lead surfaces at the rear end of said dispersing screw portion and the forward end of said first lead surface at said forward end of said pressing screw portion, wherein said gap is formed in a circumferential direction such that the rear end of each said second lead surface is circumferentially offset from the forward end of each said first lead surface, and wherein a rear end of each said thread of said second lead is disposed substantially in a common plane to a leading end of said thread of said first lead so that said pressing screw portion and said dispersing screw portion are not spaced apart in an axial direction of said screw extruder.

2. An extrusion molding apparatus for a ceramic molded product, according to claim 1, wherein said dispersing screw portion includes a thread of said second lead displaced by 10 to 350 degrees in the peripheral direction of rotation of said extruding screw with reference to the position where said second lead surface at said rear end and any of said first lead surfaces at said forward end of said first lead peripherally coincide with each other.

3. An extrusion molding apparatus for a ceramic molded product, according to claim 1,
wherein said dispersing screw portion includes two threads of said second leads displaced by 10 to 170 degrees in the peripheral direction of rotation of said extruding screw with reference to the position where any of said second lead surfaces at said rear end and any of said first lead surfaces at said forward end of said first lead peripherally coincide with each other.

4. An extrusion molding apparatus for a ceramic molded product, according to claim 1,
wherein said dispersing screw portion includes three threads of said second lead displaced by 10 to 110 degrees in the peripheral direction of rotation of said extruding screw with reference to the position where any of said second lead surfaces at said rear end and any of said first lead surfaces at said forward end of said first lead peripherally coincide with each other.

5. An extrusion molding apparatus for a ceramic molded product, comprising a shaping die for producing a ceramic molded product and a screw extruder having built therein an extruding screw for mixing and leading a ceramic material forward,
wherein said extruding screw includes a pressing screw portion for pressing said ceramic material toward said shaping die and a dispersing screw portion arranged on the same axis as said pressing screw portion adjacently to the forward end of said pressing screw portion,
wherein said pressing screw portion assumes the shape of a ridge spirally formed in an axial direction and includes at least one thread of a first lead having a first lead surface facing forward,
wherein said dispersing screw portion assumes the shape of a ridge spirally formed in an axial direction and includes at least one thread of a second lead having a second lead surface facing forward,
wherein a gap is formed in a peripheral direction between the rear ends of all of said second lead surfaces at the rear end of said dispersing screw portion and the forward end of said first lead surface at said forward end of said pressing screw portion, and
wherein said shaping die is for producing a ceramic molded product having a honeycombed structure in which partitioning walls forming a multiplicity of cells communicating through in an axial direction are arranged in the form of honeycomb, and the thickness of said partitioning walls of said ceramic molded product is not larger than 100 μm.

6. An extrusion molding apparatus for a ceramic molded product, comprising a shaping die for producing a ceramic molded product and a screw extruder having built therein an extruding screw for mixing and leading a ceramic material forward,
wherein said extruding screw includes a pressing screw portion for pressing said ceramic material toward said shaping die and a dispersing screw portion arranged on the same axis as said pressing screw portion adjacently to the forward end of said pressing screw portion,
wherein said pressing screw portion assumes the shape of a ridge spirally formed in an axial direction and includes at least one thread of a first lead having a first lead surface facing forward,
wherein said dispersing screw portion assumes the shape of a ridge spirally formed in an axial direction and includes at least one thread of a second lead having a second lead surface facing forward,
wherein a gap is formed in a peripheral direction between the rear ends of all of said second lead surfaces at the rear end of said dispersing screw portion and the forward end of said first lead surface at said forward end of said pressing screw portion, and
wherein said shaping die is for producing a sheet-like ceramic molded product, and the thickness of said partitioning walls of said ceramic molded product is not larger than 100 μm.

7. An extrusion molding apparatus for a ceramic molded product, according to claim 1,
wherein said pressing screw portion and said dispersing screw portion each have substantially the same outside diameter as defined by an outer radial surface of the threads thereof.

8. An extrusion molding apparatus for a ceramic molded product, according to claim 1,
wherein said pressing screw portion is substantially continuously threaded along the length thereof.

* * * * *